(12) United States Patent
Gammill et al.

(10) Patent No.: US 11,312,328 B2
(45) Date of Patent: Apr. 26, 2022

(54) VEHICLE TRIM OPENING DEVICE FOR AIRBAG DEPLOYMENT

(71) Applicant: Autoliv ASP, Inc., Ogden, UT (US)

(72) Inventors: Kurt L. Gammill, Layton, UT (US); Blake Garn, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 225 days.

(21) Appl. No.: 16/453,456

(22) Filed: Jun. 26, 2019

(65) Prior Publication Data

US 2020/0406851 A1 Dec. 31, 2020

(51) Int. Cl.
*B60R 21/232* (2011.01)
*B60R 21/213* (2011.01)

(52) U.S. Cl.
CPC ......... *B60R 21/232* (2013.01); *B60R 21/213* (2013.01)

(58) Field of Classification Search
CPC ............................ B60R 21/232; B60R 21/213
See application file for complete search history.

(56) References Cited

U.S. PATENT DOCUMENTS

| | | | | |
|---|---|---|---|---|
| 5,884,937 A * | 3/1999 | Yamada | ................ | B60R 21/213 280/730.2 |
| 6,142,506 A * | 11/2000 | Patel | ..................... | B60R 13/025 280/728.2 |
| 6,217,061 B1 * | 4/2001 | Harland | .................. | B60R 21/04 280/730.2 |
| 6,234,517 B1 * | 5/2001 | Miyahara | ................ | B60R 21/04 280/730.2 |
| 7,000,945 B2 * | 2/2006 | Bakhsh | ................. | B60R 21/213 280/728.2 |
| 7,322,601 B2 * | 1/2008 | Bertossi | ................ | B60R 21/213 280/730.2 |
| 7,401,805 B2 * | 7/2008 | Coon | .................... | B60R 21/201 280/730.2 |
| 7,597,342 B2 * | 10/2009 | Cheal | .................... | B60R 21/217 280/728.2 |
| 7,828,321 B2 * | 11/2010 | Bakhsh | ................. | B60R 21/237 280/730.2 |
| 8,286,991 B2 * | 10/2012 | Shimazaki | ............ | B60R 21/213 280/728.2 |

(Continued)

OTHER PUBLICATIONS

Jun. 19, 2020 PCT/US2020/028584, International Search Report (6 pgs).
Jun. 19, 2020 PCT/US2020/028584, Written Opinion (8 pgs).

*Primary Examiner* — Jonathan Ng
*Assistant Examiner* — Joselynn Y Sliteris
(74) *Attorney, Agent, or Firm* — Matthew D. Thayne; Thayne and Davis LLC

(57) ABSTRACT

Airbag cushion modules and vehicles comprising lever elements to facilitate opening adjacent vehicle structures. Some embodiments may comprise curtain airbag cushion assemblies comprising an inflator and a curtain airbag cushion fluidly coupled with the inflator. The curtain airbag cushion may be configured to deploy in a deployment direction adjacent to a vehicle door. A lever member may be coupled, operably and/or physically, with the curtain airbag cushion and may be configured to pivot during deployment of the curtain airbag cushion using forces generated from inflation of the curtain airbag cushion to pry an adjacent portion of a vehicle interior open during deployment.

14 Claims, 16 Drawing Sheets

(56) References Cited

U.S. PATENT DOCUMENTS

| | | | |
|---|---|---|---|
| 8,936,270 B2 * | 1/2015 | Kurahashi | B60R 21/23138 |
| | | | 280/730.2 |
| 9,333,935 B2 * | 5/2016 | Kim | B60R 21/2334 |
| 2004/0108693 A1 * | 6/2004 | Foster | B60R 21/213 |
| | | | 280/730.2 |
| 2006/0043703 A1 | 3/2006 | Enriquez | |
| 2007/0132217 A1 | 6/2007 | Seong | |
| 2015/0217715 A1 | 8/2015 | Kim | |

* cited by examiner

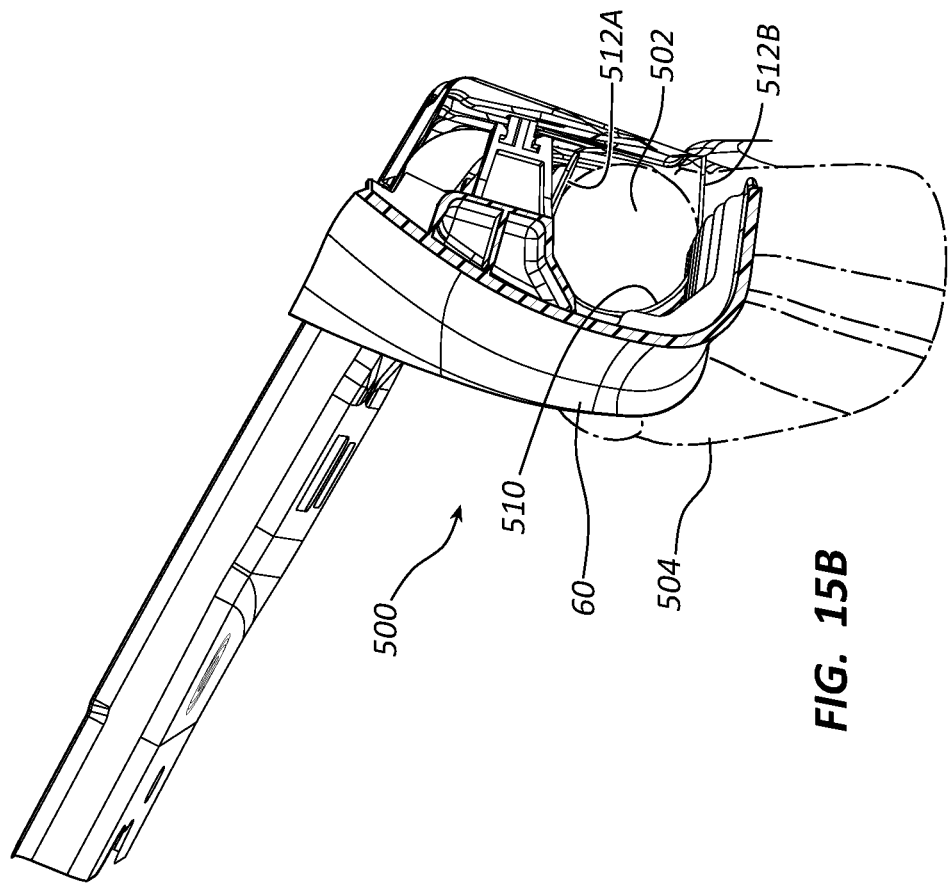
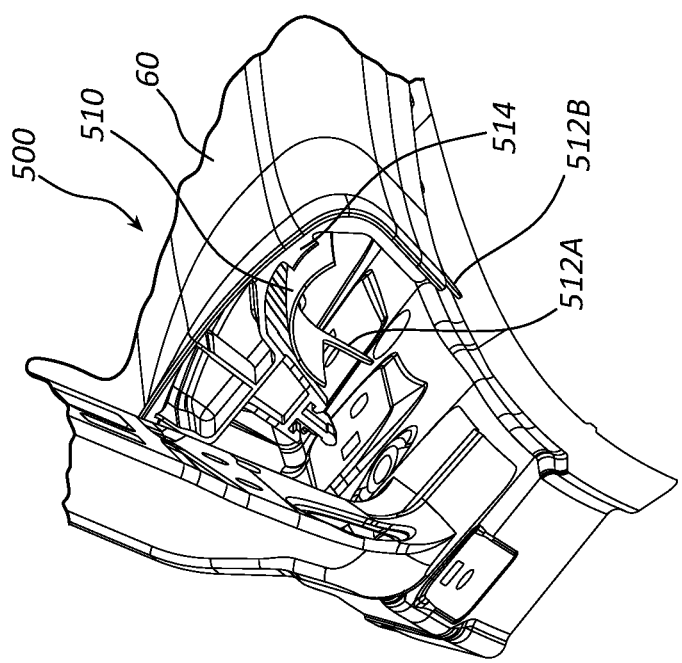
FIG. 15B
FIG. 15A

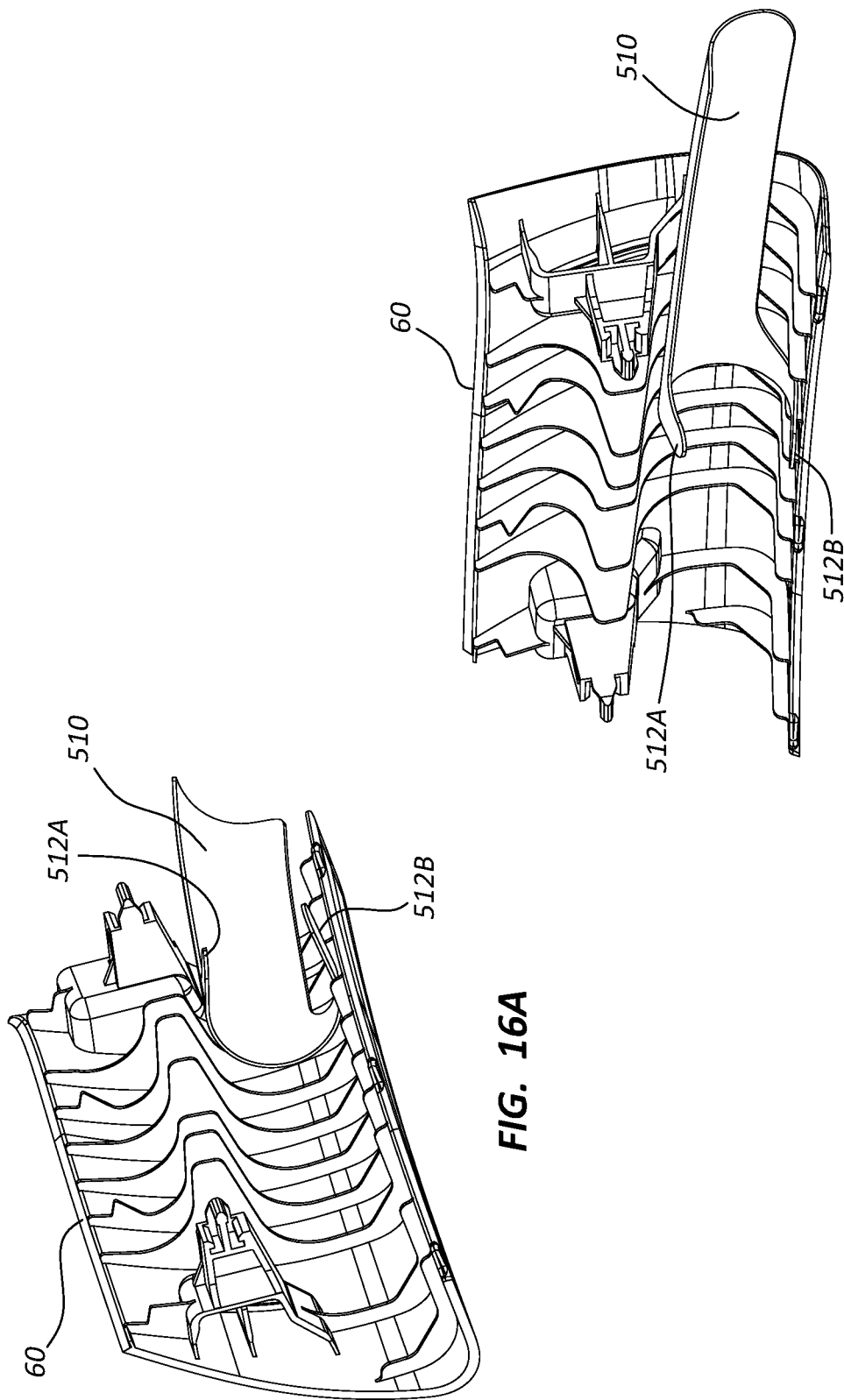

VEHICLE TRIM OPENING DEVICE FOR AIRBAG DEPLOYMENT

SUMMARY

Airbag cushions are often deployed from behind openable structures, such as in the case of side curtain airbag cushions, from a pillar trim element and/or headliner of the vehicle. However, cushion deployment can be obstructed by such structures due to, for example, the stiffness of the material and/or the manner in which the structure is coupled with adjacent vehicle structures. This issue may be particularly problematic at low temperatures, which typically adds to the stiffness of polymers used to manufacture trim elements from which curtain airbag cushions are deployed.

The present inventors have therefore determined that it would be desirable to provide apparatus, systems and methods that overcome one or more of the foregoing limitations and/or other limitations of the prior art. In some embodiments, the inventive concepts disclosed herein may therefore provide a "pry bar" or lever member that may be used to facilitate opening an adjacent trim element or other openable structure in a quicker and/or more complete manner so as to allow the cushion to deploy therefrom without, or at least with less, resistance.

In a more particular example of an airbag cushion assembly according to some embodiments, the airbag cushion assembly may comprise an inflator and a curtain airbag cushion fluidly coupled with the inflator. The curtain airbag cushion may be configured to deploy in a deployment direction adjacent to a vehicle door, which is typically downward from a deployment chamber behind one or more of trim panels of the vehicle adjacent a roof rail. A lever member may be coupled with the curtain airbag cushion and may be configured to pivot during deployment of the curtain airbag cushion using forces generated from inflation of the curtain airbag cushion to pry an adjacent portion of a vehicle interior, such as a pillar trim panel, open during deployment.

In some embodiments, the curtain airbag cushion is in an at least substantially cylindrical configuration prior to deployment. In some such embodiments, the lever member may comprise a curved surface configured to allow the lever member to be seated on a curved surface of the at least substantially cylindrical curtain airbag cushion.

In some embodiments, the lever member may further comprise one or more prongs that may extend from the lever member, such as from a first end of the lever member. In some embodiments, the lever member may comprise an elongated lever member extending along an elongated axis defined between the first end and a second end opposite the first end. In some such embodiments, the prong may extend from the lever member in a direction at least substantially perpendicular to the elongated axis so as to define, at least in part, a prong surface opposite from the curved surface. The prong may be configured to serve as a pivot point against at least a portion of the vehicle to pry the adjacent portion of the vehicle interior open during deployment. In some embodiments comprising a second prong, the second prong may extend from the first end of the lever member in a direction opposite from the first prong.

In another example of an airbag cushion assembly according to other embodiments, the assembly may comprise an elongated airbag cushion, such as a curtain airbag assembly, extending along an elongated axis and configured to deploy in an uneven manner in a deployment direction at least substantially perpendicular to the elongated axis such that one or more portions of the elongated airbag cushion extend in the deployment direction before one or more other portions of the elongated airbag cushion during inflation. An elongated lever member may be coupled to the elongated airbag cushion and may comprise a first end and a second end opposite the first end. The elongated lever member may be positioned and configured to receive a force from the elongated airbag cushion during inflation at the first end before the second end so as to pivot the elongated lever member and apply a prying force to an adjacent structure during inflation.

In some embodiments, the elongated lever member may further comprise a curved surface, which may be configured to nestably seat on a curved surface of the elongated airbag cushion, such as a cover or housing of the elongated airbag cushion, prior to deployment.

In some embodiments, the elongated lever member may further comprise a prong extending from the second end. In some such embodiments, the prong may extend from the elongated lever member in a direction at least substantially perpendicular to an axis of the elongated lever member extending between the first and second ends. Some embodiments may further comprise a second prong extending from the second end of the lever member in a direction opposite from the prong, in some cases so as to define a partial opening for receipt of the airbag cushion housing/module/cover therein.

Some embodiments may comprise multiple lever members. Thus, some embodiments may comprise a second elongated lever member, or even further such members, coupled to the elongated airbag cushion. The second elongated lever member may also comprise a first end and a second end opposite the first end and may be positioned and configured to receive a force from the elongated airbag cushion during inflation at the first end before the second end so as to pivot the second elongated lever member and apply a prying force to a second adjacent structure (or in other cases to another portion of the first adjacent structure) of the vehicle during inflation.

In an example of a vehicle comprising an airbag module according to some embodiments, the vehicle may comprise a deployment chamber comprising an openable structure and an airbag module positioned within the deployment chamber adjacent to the openable structure. The airbag module may comprise an airbag cushion, such as a curtain airbag cushion, configured to deploy from the deployment chamber by opening the openable structure. The vehicle may comprise a lever member operably coupled with the airbag module such that deployment of the airbag cushion forces the lever member against the openable structure to facilitate opening of the openable structure during deployment.

The lever member may be part of and/or coupled to the vehicle or may be part of the module that itself is inserted into the vehicle. Thus, in some embodiments, the lever member may be pivotably coupled with the vehicle, such as pivotably coupled with a trim panel of the vehicle or a body of the vehicle. Some embodiments may comprise a pivoting bracket coupled with the body and pivotably coupled with the lever member.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIGS. 15A and 15B are cross-sectional views of the panel-mounted curtain airbag assembly during deployment; and FIGS. 16A and 16B are perspective views of the panel-mounted curtain airbag assembly during deployment with the airbag cushion removed.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
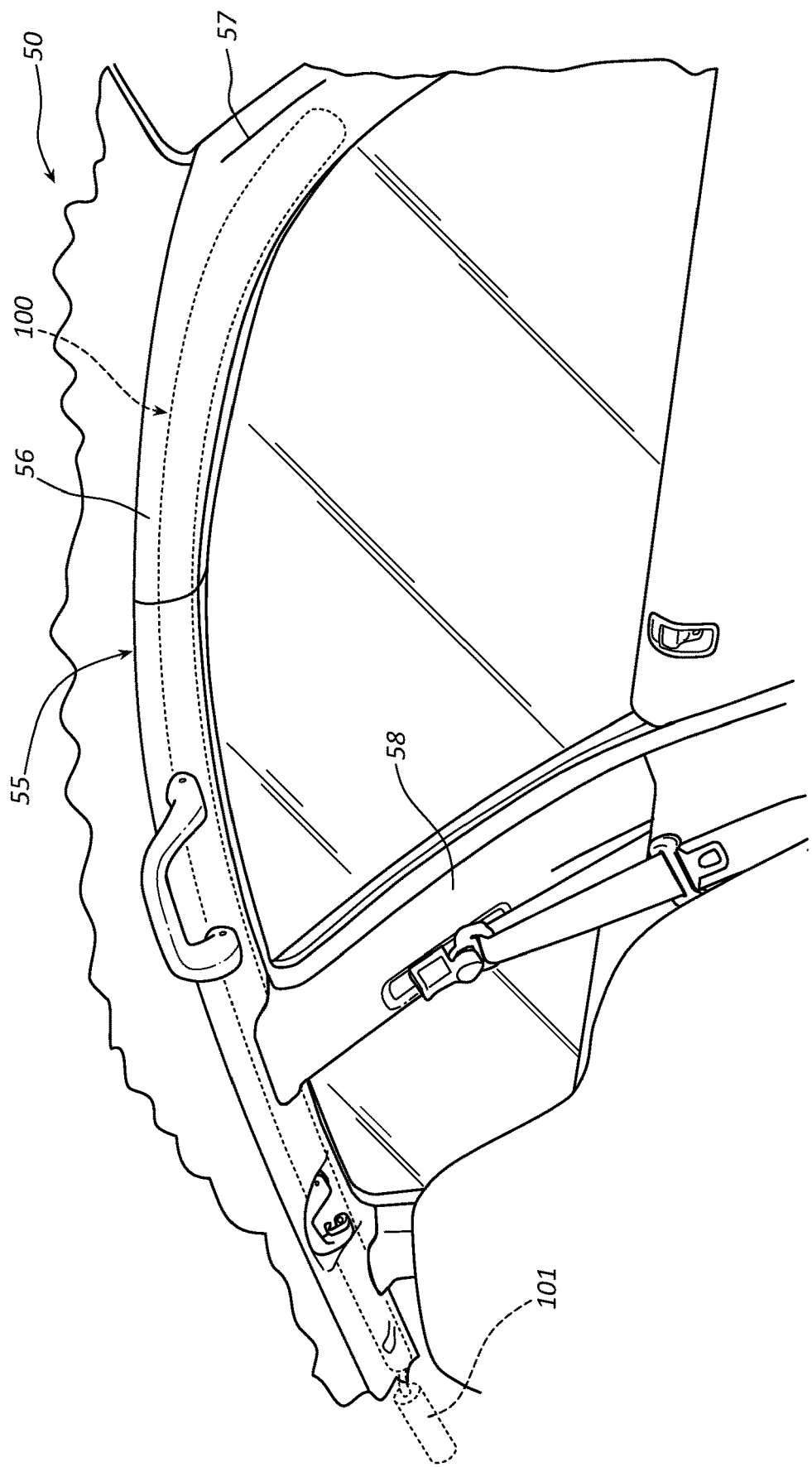
FIG. 1 depicts the interior of a vehicle comprising a curtain airbag assembly according to some embodiments.

FIG. 1 depicts the interior of a vehicle 50. More particularly, roof rail 55, which may be considered part of A-pillar 57, is shown extending to B-pillar 58. Rail 55 and/or A-pillar 57 comprises a deployment chamber 56 within which an airbag module or portion of an airbag module, such as curtain airbag module 100, may be positioned and from which may deploy using inflator 101. One or more regions of the deployment chamber 56 may be openable and may therefore be referred to herein as "openable structures." Examples of possible openable structures may include various trim panels 60, as shown in FIG. 2, other trim elements, a portion of a vehicle headliner, or an airbag cover, etc.

Figure 2:
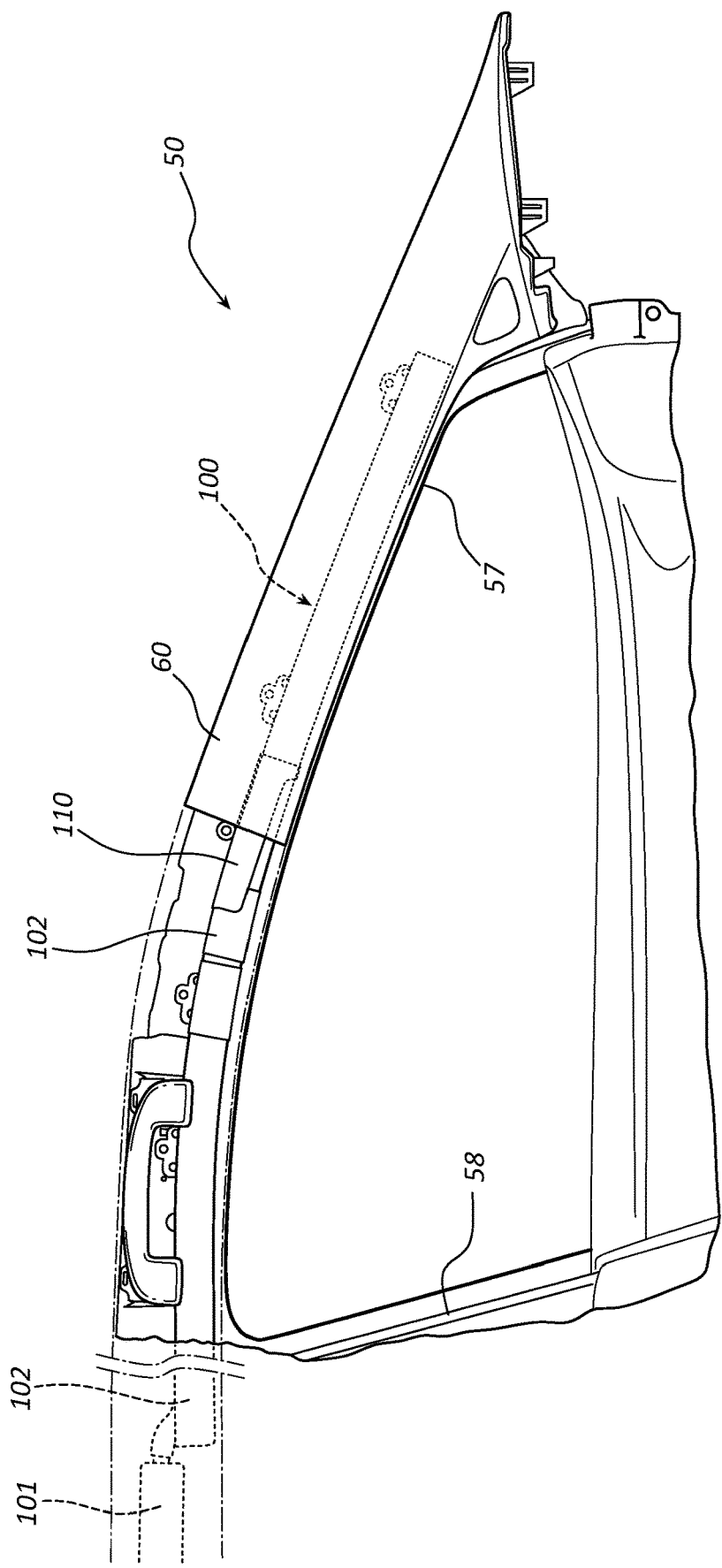
FIG. 2 is a partial cutaway and phantom view of the vehicle shown in FIG. 1 to illustrate the curtain airbag assembly therewithin.

As also shown in FIG. 2, curtain airbag module 100 is positioned within vehicle trim panel 60 and may extend within other trim panels as those of ordinary skill in the art will appreciate. Airbag module 100 comprises a cushion and/or cover 102 and a lever member 110 coupled with the cushion and/or cover 102. As described in greater detail below, lever member 110 is configured to apply a lever and/or prying force to assist in opening one or more panels 60 or other elements of the vehicle trim during deployment of the airbag cushion of airbag module 100. Providing this assistance forces of lever member 110 may provide for a smoother deployment of the airbag cushion from its deployment chamber 56 and associated trim panel 60, which may otherwise in some instances result in incomplete deployment and/or damage to the cushion during deployment due to the stiffness of trim panel 60, which is typically made of a firm, hard, and relatively inflexible plastic material. Lever member 110 is preferably formed from a hard, stiff material, such as a metal or stiff plastic material. It should be understood, however, that the inventive principles disclosed herein may be applied to a wide variety of alternative embodiments and implementations, including, for example, deployment of curtain airbag cushions from chambers other than a pillar trim chamber, deployment of non-curtain airbag cushions, and the like.

Figure 3:
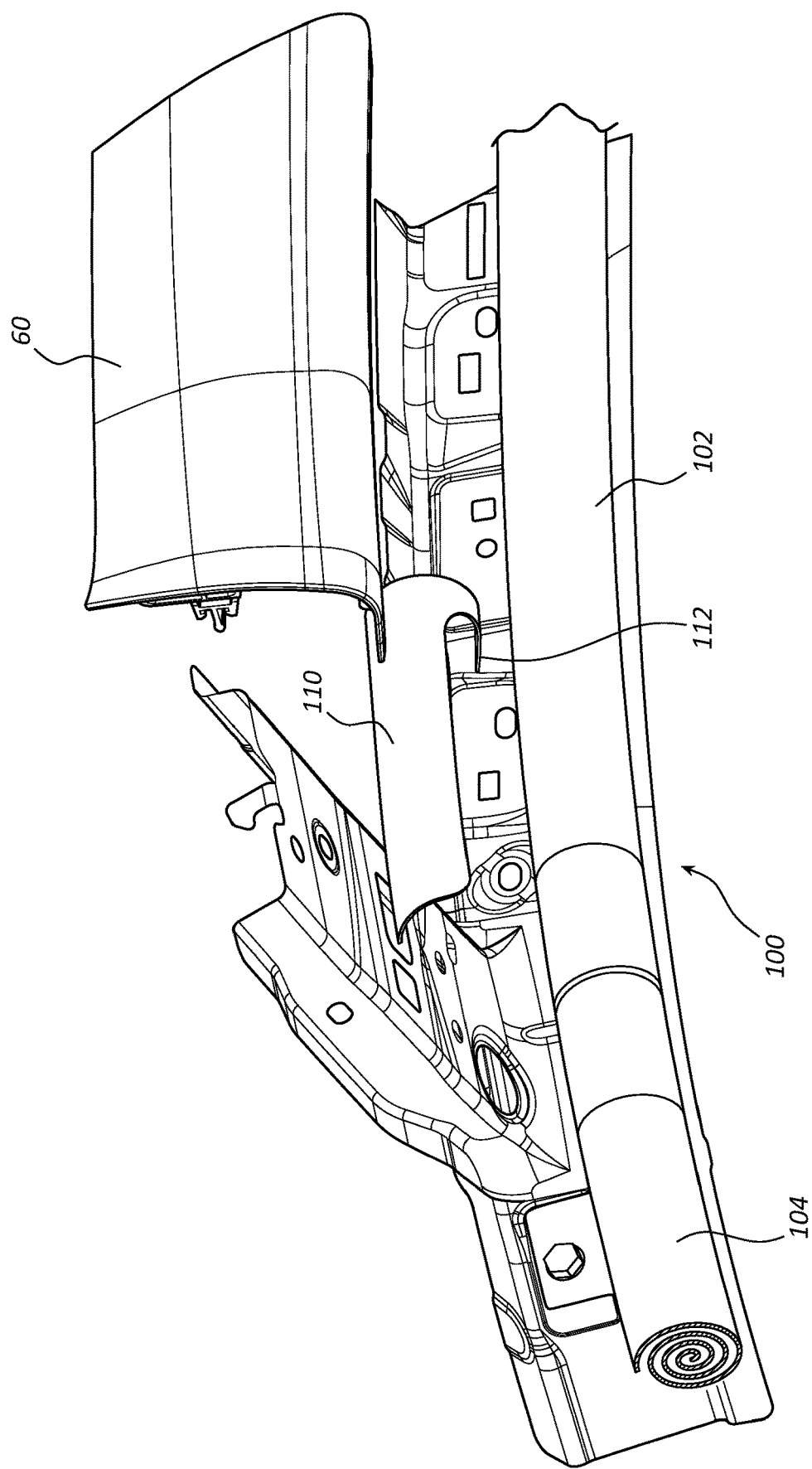
FIG. 3 is an exploded, perspective view of the curtain airbag assembly.

FIG. 3 is an exploded view illustrating additional elements of the airbag system shown in FIG. 2. More particularly, airbag cushion 104 is shown rolled or otherwise compressed into a cylindrical configuration. Cushion 104 may also have a cover 102, which may, in some embodiments, also be formed in an elongated, cylindrical shape. Lever member 110, which is shown exploded away from cushion 104 in FIG. 3, may therefore comprise a body having a curved inner surface configured to allow the lever member 110 to be seated in a nesting manner on the curved exterior surface of the airbag module, cushion 104, and/or cover 102.

Figure 4:
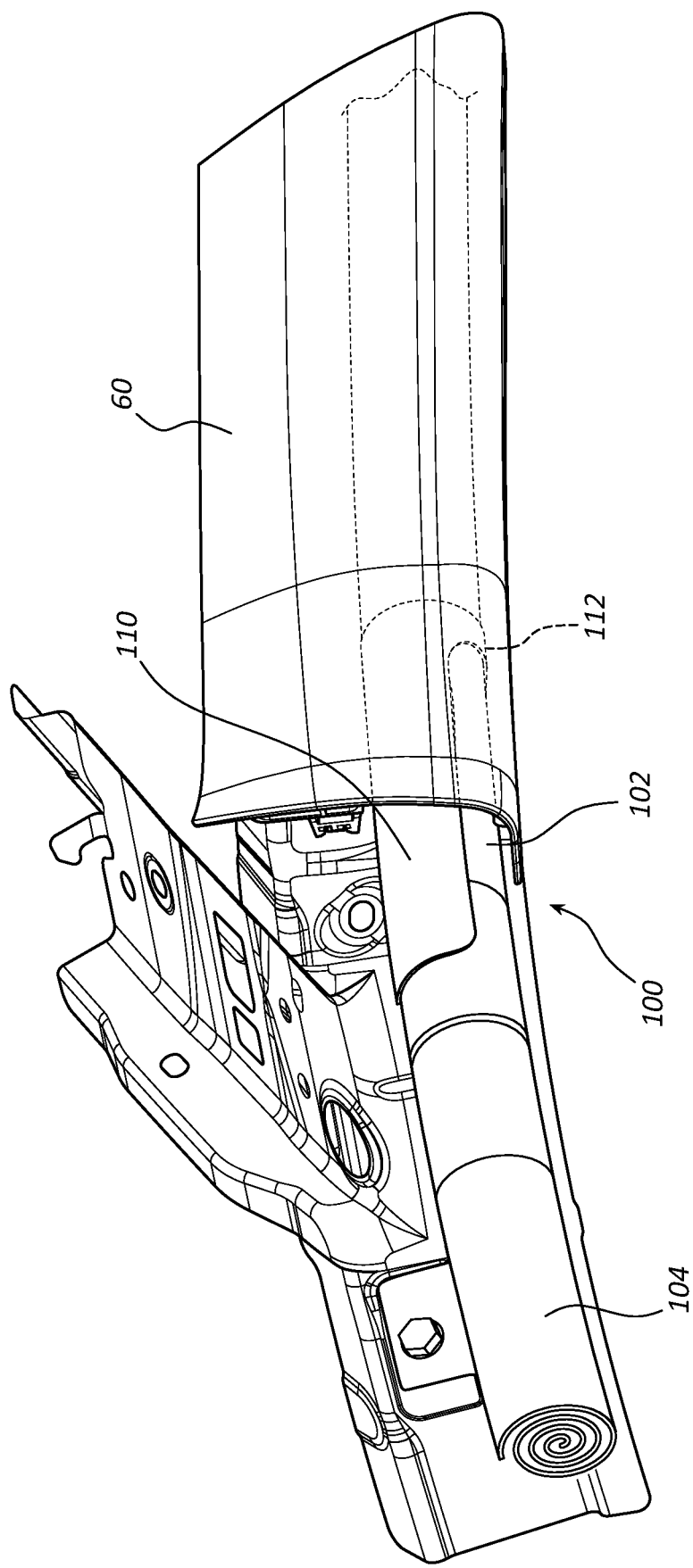
FIG. 4 depicts the curtain airbag assembly prior to deployment.

As also shown in FIG. 3, lever member 110 may further comprises a prong 112 extending from a first end of the body. In the depicted embodiment, prong 112 extends from the end of the body in a direction perpendicular, or at least substantially perpendicular, to the elongated axis of the body and, in addition, defines a lower prong surface opposite from the curved surface. This surface may also, in some embodiments, match or at least substantially match the opposite surface of the airbag cover 102 and/or cushion 104 so that the lever member 110 defines a partial opening at one end and can be coupled to the cover 102 adjacent to two opposing surfaces of the cover 102, as illustrated in FIG. 4. As better shown in connection with other figures and described in greater detail below, prong 112 may also be configured to provide a fulcrum or pivot point for applying leverage and/or a prying force to panel 60. As also shown and described below, multiple prongs may be provided in the depicted embodiment or alternative embodiments. For example, a prong similar to prong 112 may extend in the opposite direction to more fully define an opening and/or opposing coupling surfaces for receipt of airbag module 102 therein, as is depicted in other figures.

Figure 5:
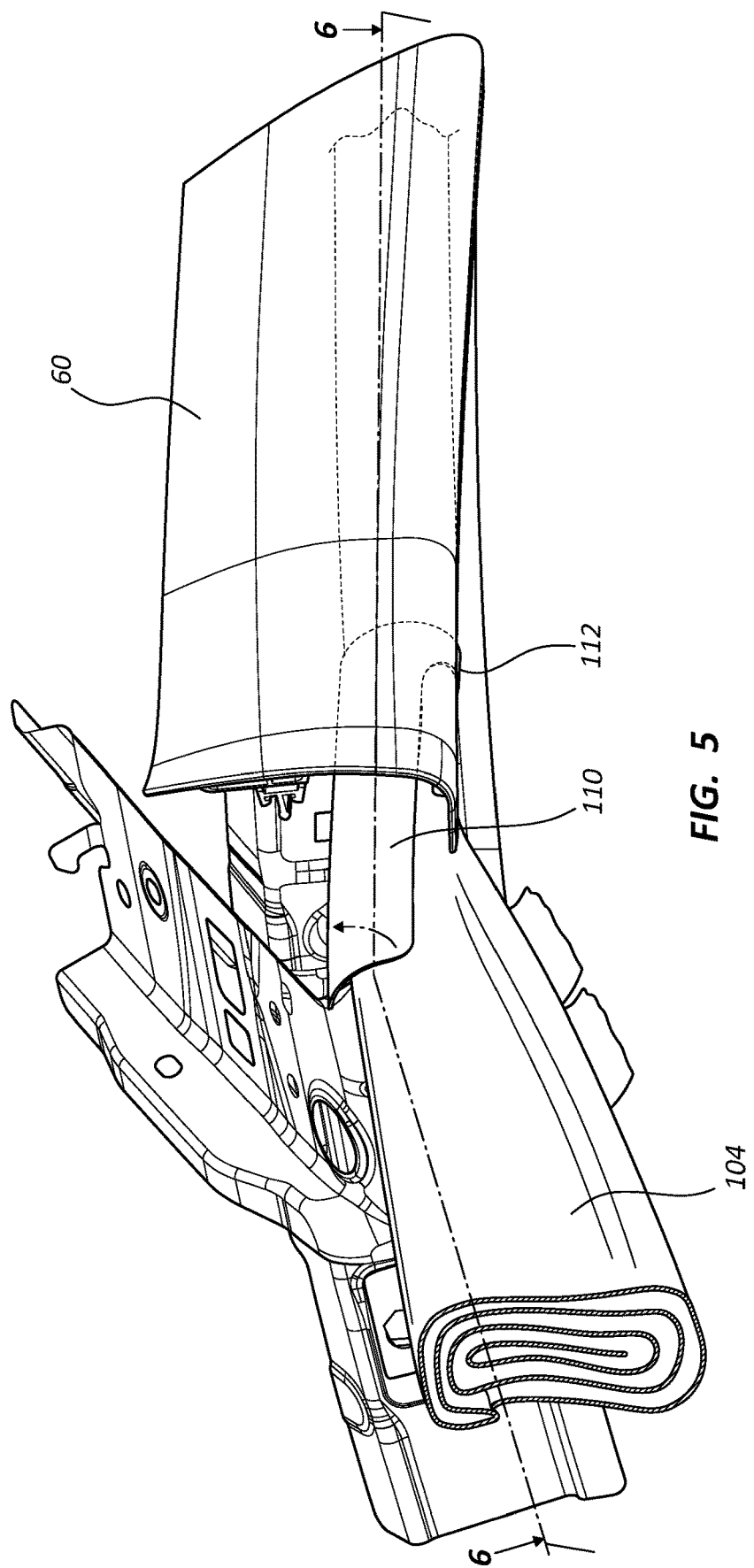
FIG. 5 depicts the curtain airbag assembly during deployment and illustrates the lever member assisting in opening the adjacent trim panel.

FIG. 5 illustrates airbag cushion 104 during deployment. As shown in this figure, airbag cushion 104 inflates in a left-to-right direction from the perspective of the viewer of FIG. 5 and therefore the left portion of cushion 104 extends in the deployment direction (downward) before the portion of cushion 104 adjacent to lever member 110. In this manner, lever member 110 receives a force at one end before the other and may thereby be configured to pivot, rotate, or otherwise move to provide an assisting force in opening panel 60 that may be delivered by the expansion of airbag cushion 104. It should be understood that additional lever members may be provided as needed in some embodiments. For example, in the case of an inflator mounted in the mid-portion of the vehicle, another lever member may be provided on the opposite side of inflator 101 or otherwise, so as to receive a non-uniform deployment force caused by expansion of airbag cushion 104 in the deployment direction that contacts one end of the other lever member before its opposite end, to facilitate opening another panel or vehicle structure that may be positioned adjacent to another part of the cushion 104. These principles may also be applied to open structures adjacent to non-curtain airbags, such as airbag covers and the like.

Figure 6:
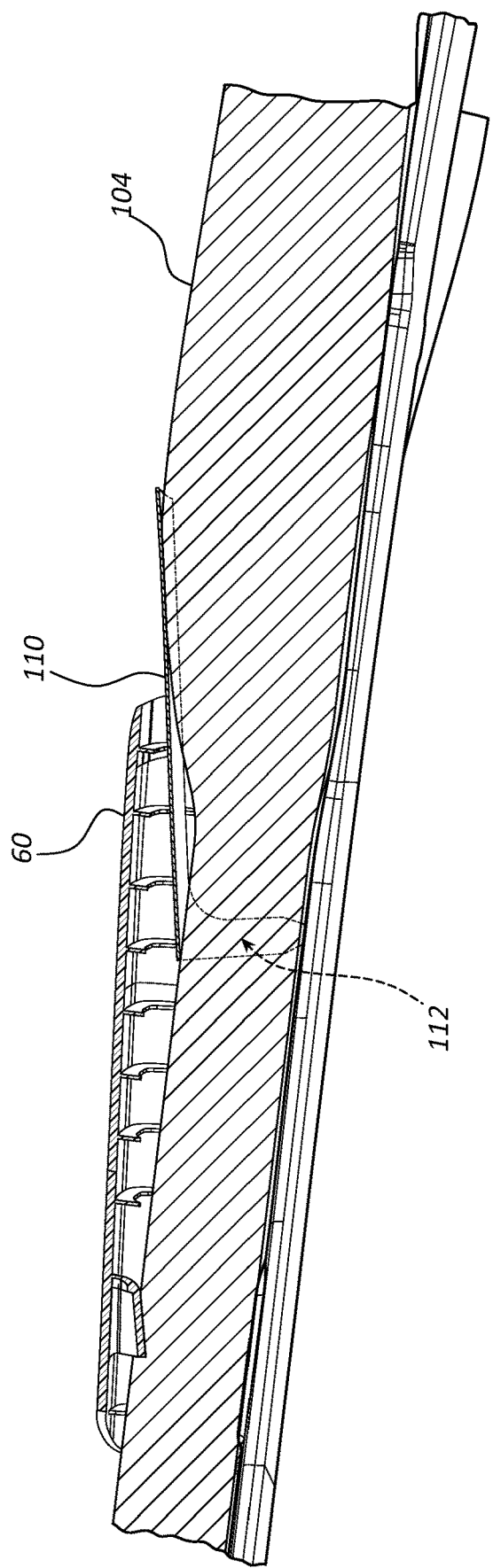
FIG. 6 is a cross-sectional view taken along line 6-6 in FIG. 5.

Prong 112 may provide a fulcrum or pivot point against an adjacent structure of the vehicle, such as panel 60, or may be configured to deliver the force that may be provided by another part of lever member 110. By providing a circular or otherwise curved upper surface, the body of lever member 110 may be configured to provide a fulcrum or pivot point and one or more legs or prongs, such as prong 112, may deliver the force to the opposite end of the lever member 110, as shown in FIG. 5 and in the cross-sectional view of FIG. 6. As also shown in FIG. 5, in some embodiments, lever member 110 may also be configured to turn about its elongated axis, as indicated by the arrow in FIG. 5, to allow cushion 104 to deploy without lever member 110 getting in the way during deployment.

Figure 7:
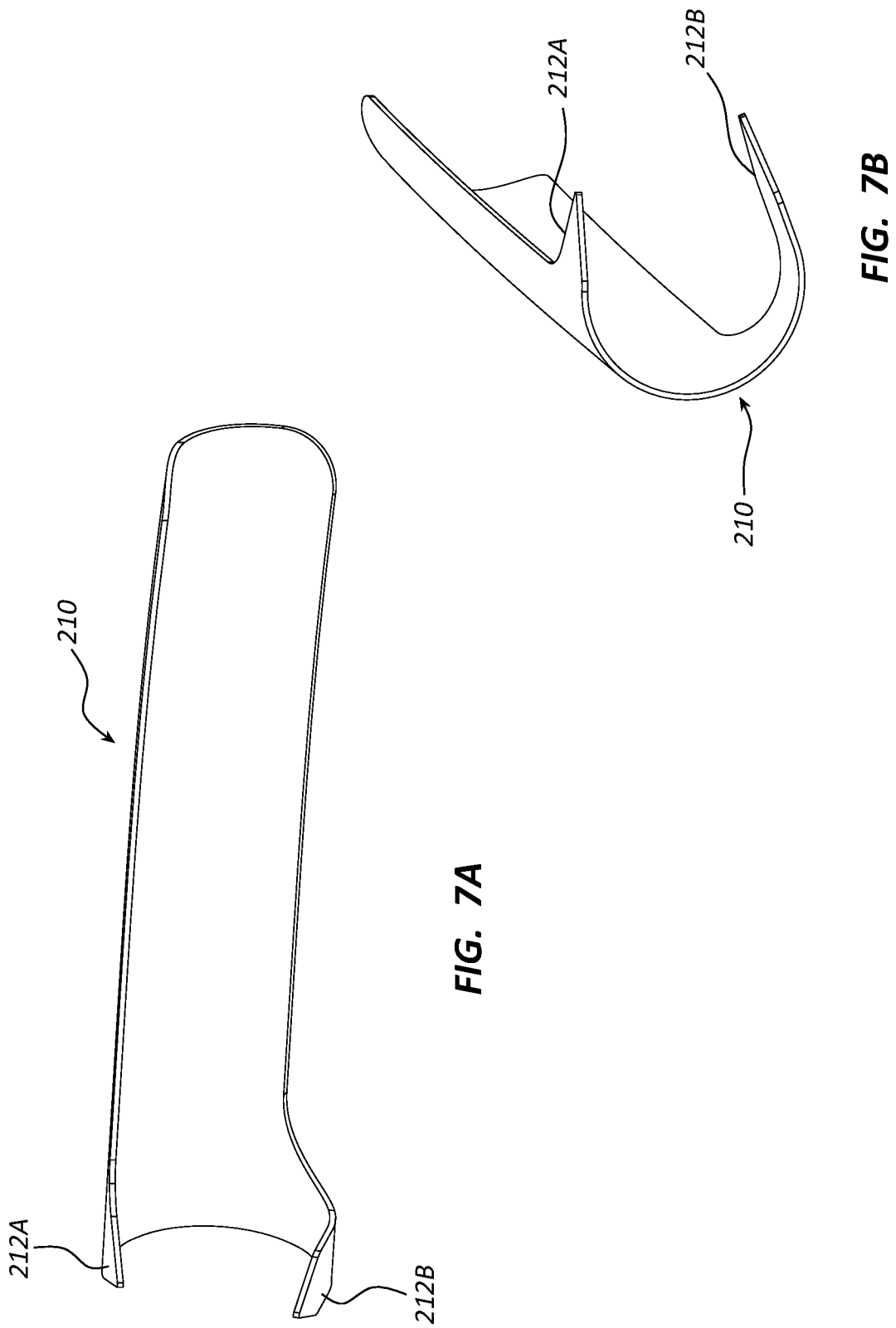
FIGS. 7A and 7B are perspective views of a lever member for use with airbag assemblies according to certain embodiments.
Figure 8:
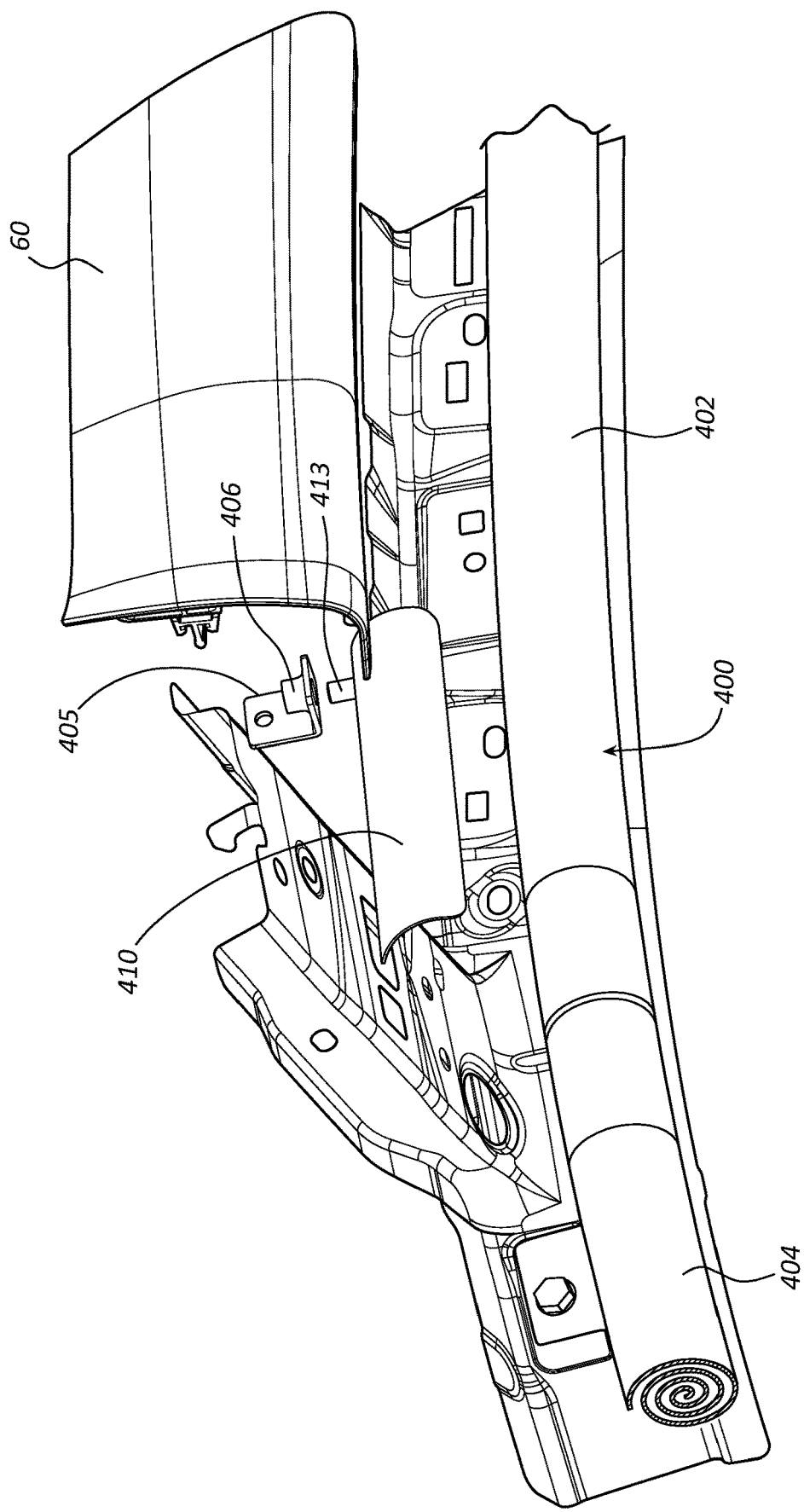
FIG. 8 is an exploded, perspective view of a curtain airbag assembly comprising a lever member mounted on the vehicle body according to alternative embodiments.
Figure 9:
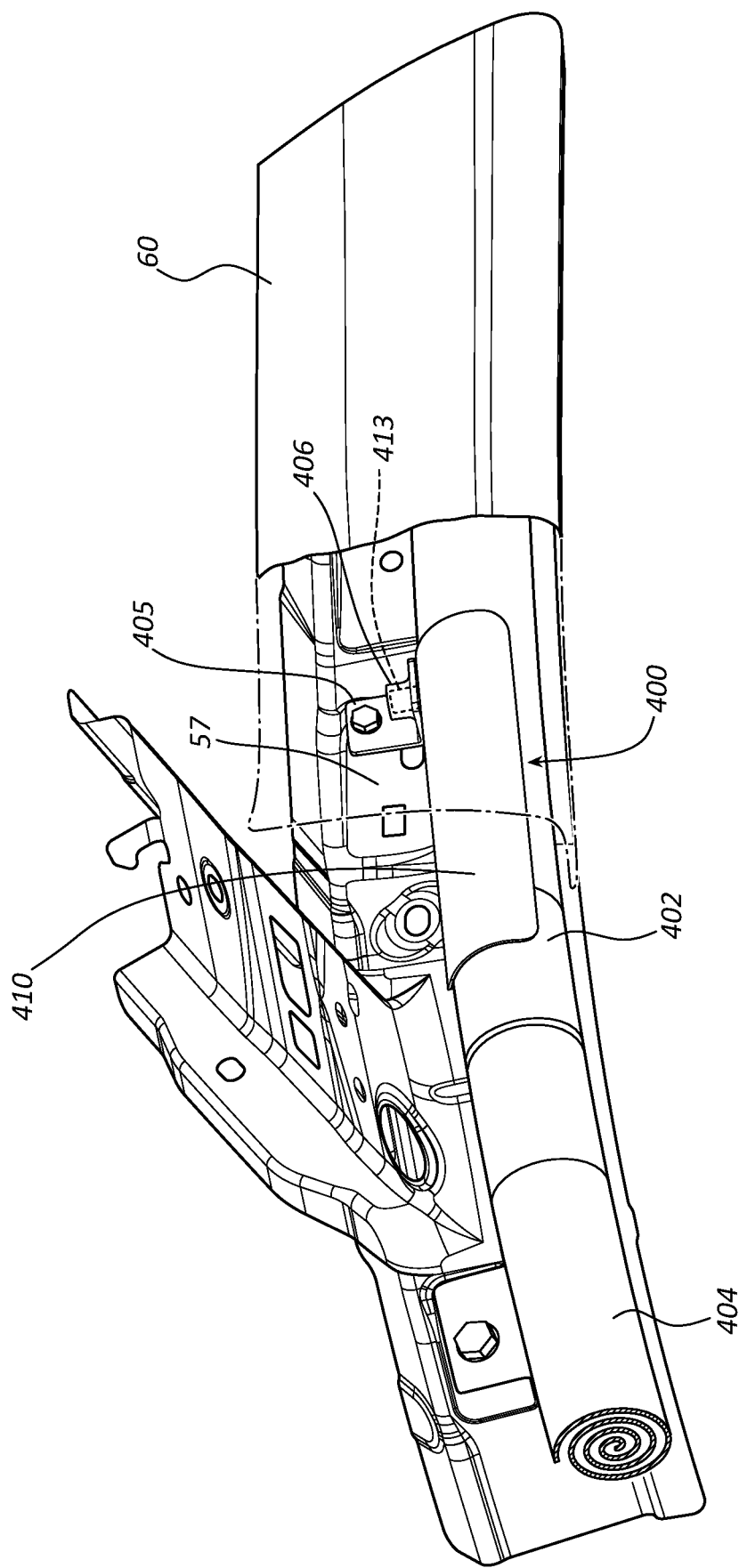
FIG. 9 is a partial phantom view of the embodiment of FIG. 8 illustrating how the lever member is mounted to the vehicle.

FIGS. 7A and 7B depict an embodiment of a lever member 210 comprising two opposing pivoting prongs, namely, prong 212A and prong 212B. As shown in these figures, prongs 212A and 212B may comprise curved inner surfaces that may, at least in part match, or at least substantially match or approximate, the curvature of the body of lever member 210 and/or the airbag module to which lever member 210 is to be coupled. In this manner, lever member 210 may be securely coupled to a cylindrical airbag module by, for example, sliding lever member 210 over the module through the partial opening defined by prongs 212A and 212B.

As also shown in these figures, one or both of prongs 212A and 212B may comprise a pointed tip, which may serve as a specific point of contact with an adjacent portion of a vehicle structure, such as panel 60, the frame of the vehicle, or an adjacent headliner structure. Rounded tips may be preferred in other embodiments, however, which may allow the lever member to more easily pivot about the distal ends of the prongs. In addition, one of prongs 212A and 212B may be longer than the other and may be configured to extend to contact such an adjacent vehicle structure. Thus, in the depicted embodiment, prong 212B is longer than prong 212A and comprises both a curved and straight portion that may provide both of these aforementioned benefits—i.e., defining a semi-circular or otherwise curved opening to securely couple an airbag module and providing an extended point of contact with an adjacent vehicle structure to facilitate prying an enclosing vehicle structure open during deployment. One or more of these edges/portions may comprise a taper or angle that may further guide the rotation and/or pivoting of the lever member 210 during deployment, as also depicted in FIGS. 7A and 7B.

FIGS. 8-11 illustrate an alternative embodiment of an airbag system 400 comprising a lever member 410. System 400 differs from module 100 in that lever member 410 is physically coupled to the vehicle itself rather than just the airbag module itself, such as to cover 402. More particularly, lever member 410 is mounted to pillar/frame 57 of the vehicle. Although it is contemplated that this coupling may be provided in a number of ways, many of which should be apparent to those of ordinary skill in the art after having received the benefit of this disclosure, in the depicted embodiment, lever member 410 comprises a mounting pin 413 that extends from prong 412 (see FIG. 11). Prong 412 may otherwise be similar to the prongs previously discussed.

Mounting pin 413 may be inserted into a mounting bracket 405 that may be welded or otherwise coupled to pillar/frame 57, or another suitable portion of the vehicle, such as by use of bolts, screws, or other fasteners. Mounting bracket 405 comprises an opening to receiving mounting pin 413, which may allow lever member 410 to be rotatably or pivotably coupled with the airbag module cover 402 and/or vehicle. In the depicted embodiment, this opening is formed in a mounting knob 406 formed on bracket 405 and is configured to receiving pin 413. However, a wide variety of alternative configurations are contemplated, such as use of hinges, linkages, grooves, protrusions, etc. Or, as mentioned above, the lever member may simply be coupled to the airbag module by nesting it thereon, or otherwise without providing a fixed and/or rigid coupling, and various elements or portions of the lever member itself, such as a portion of the exterior surface and/or a protrusion therefrom, alone or in combination with the aforementioned prongs, may facilitate the desired movement of the lever member to assist in opening an adjacent openable structure.

Figure 10:
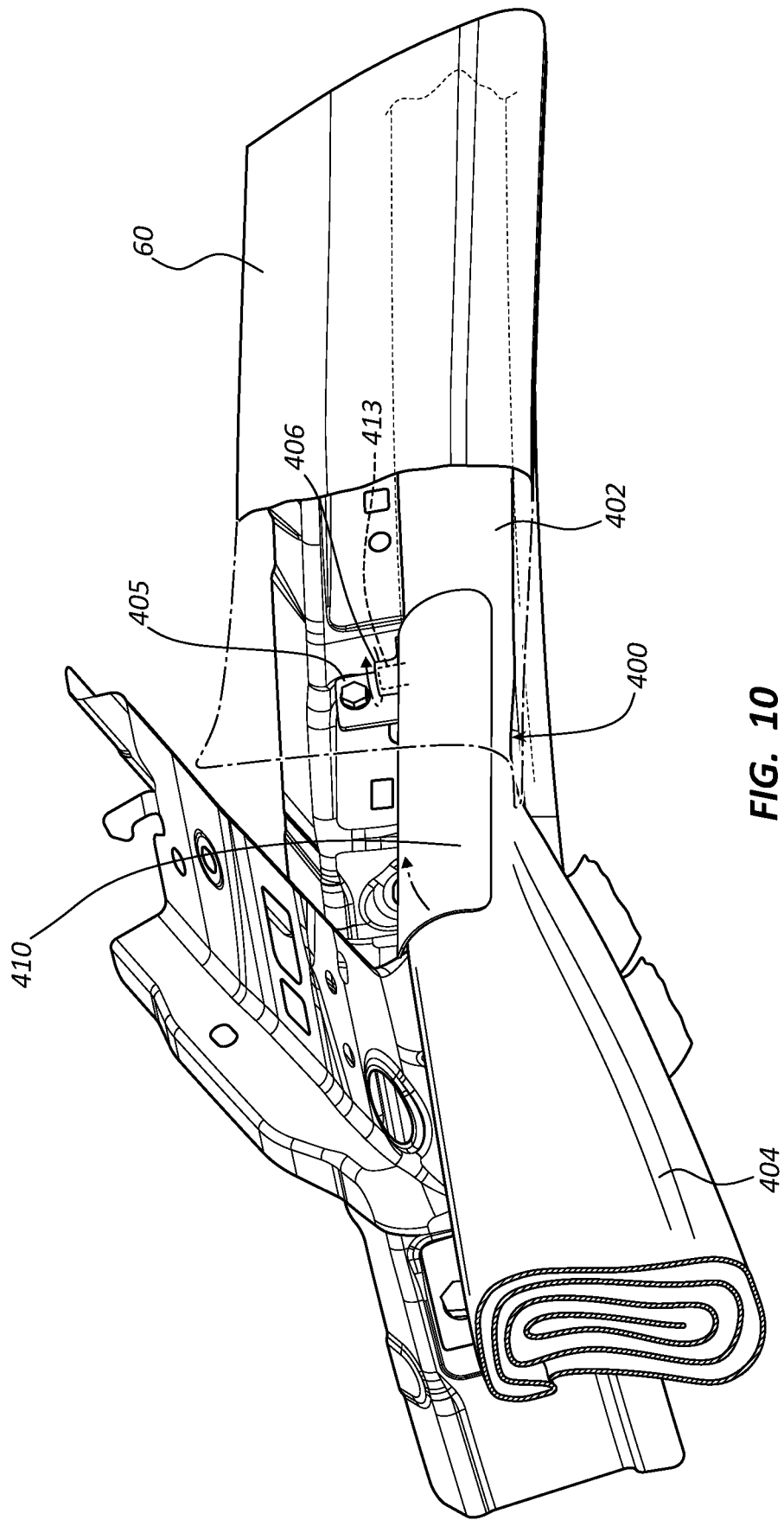
FIG. 10 depicts the embodiment of FIGS. 8 and 9 during deployment.

Thus, as shown in FIG. 10, which depicts system 400 during airbag deployment, lever member 410 may be rotated, as indicated by the arrow in FIG. 10, within the opening of mounting bracket 405 by virtue of the directional force caused by expansion of airbag cushion 404 in a non-uniform manner (i.e., expansion in the downward/deployment direction that is directed to the left end of lever member 410 before its right end). This pivoting and/or rotational force may be applied to adjacent panel 60 to pry panel 60 open as airbag cushion 404 deploys.

Figure 11B:
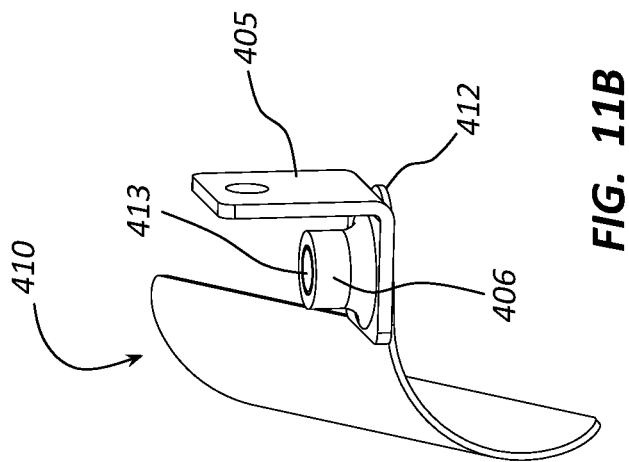
FIGS. 11A and 11B are perspective views of the vehicle-mounted lever member.
Figure 11A:
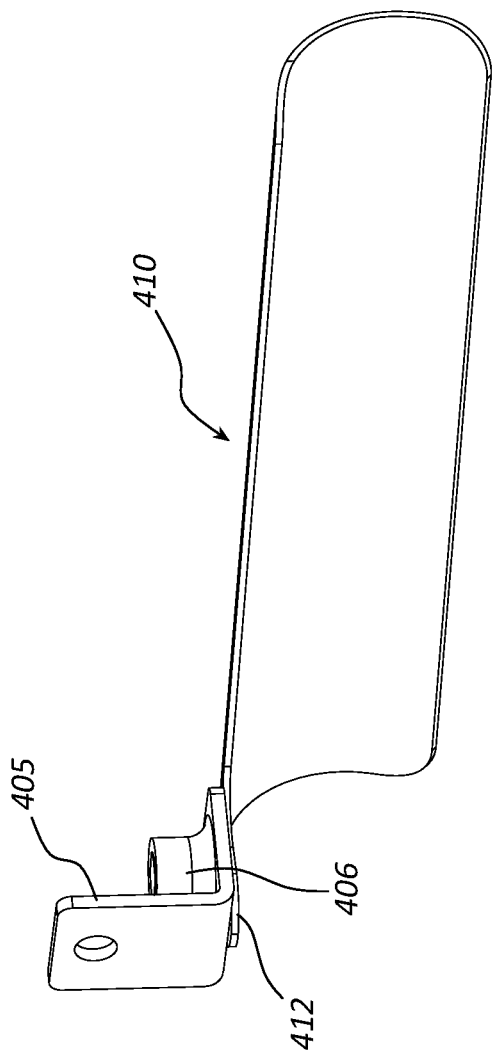
Figure 12:
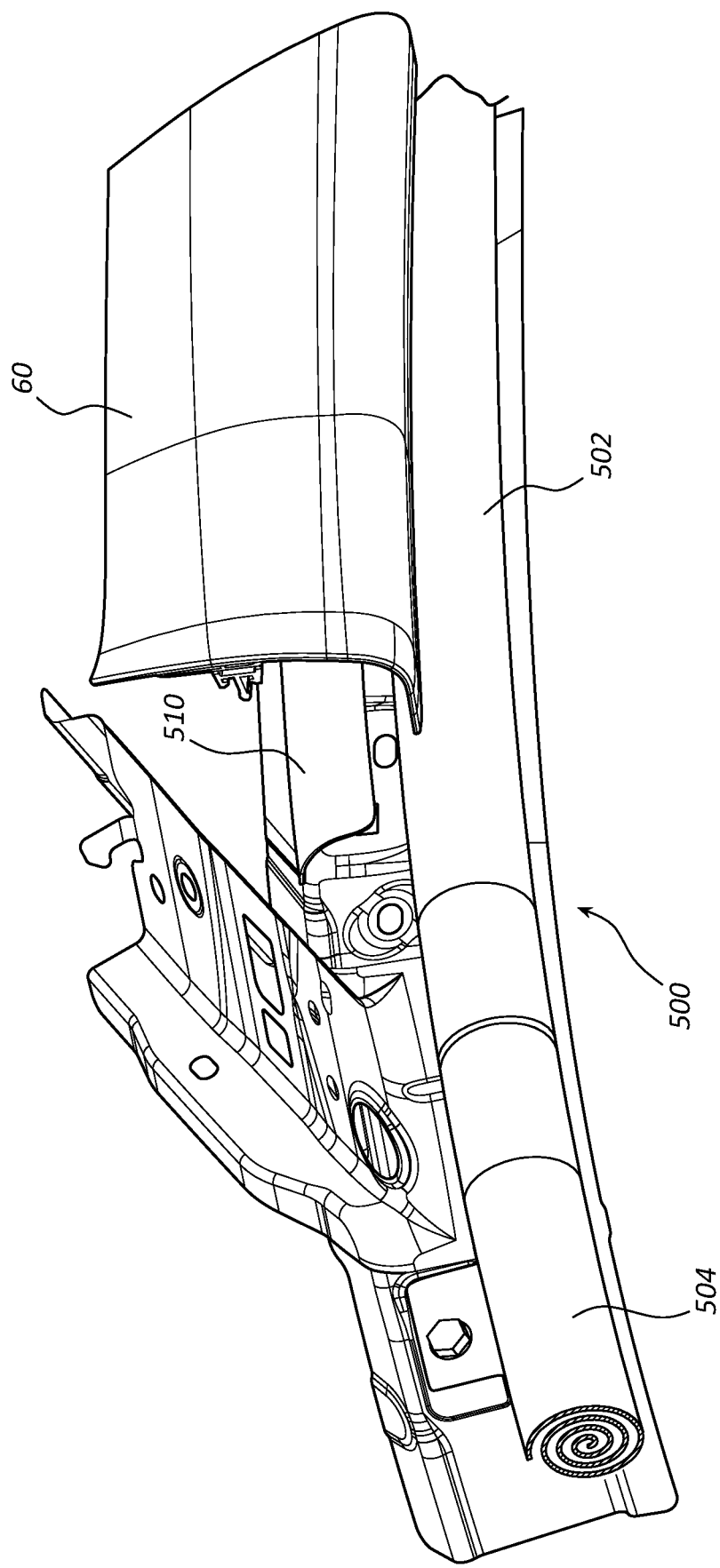
FIG. 12 is an exploded, perspective view of a curtain airbag assembly comprising a lever member coupled with the trim panel of a vehicle according to other embodiments.
Figure 13:
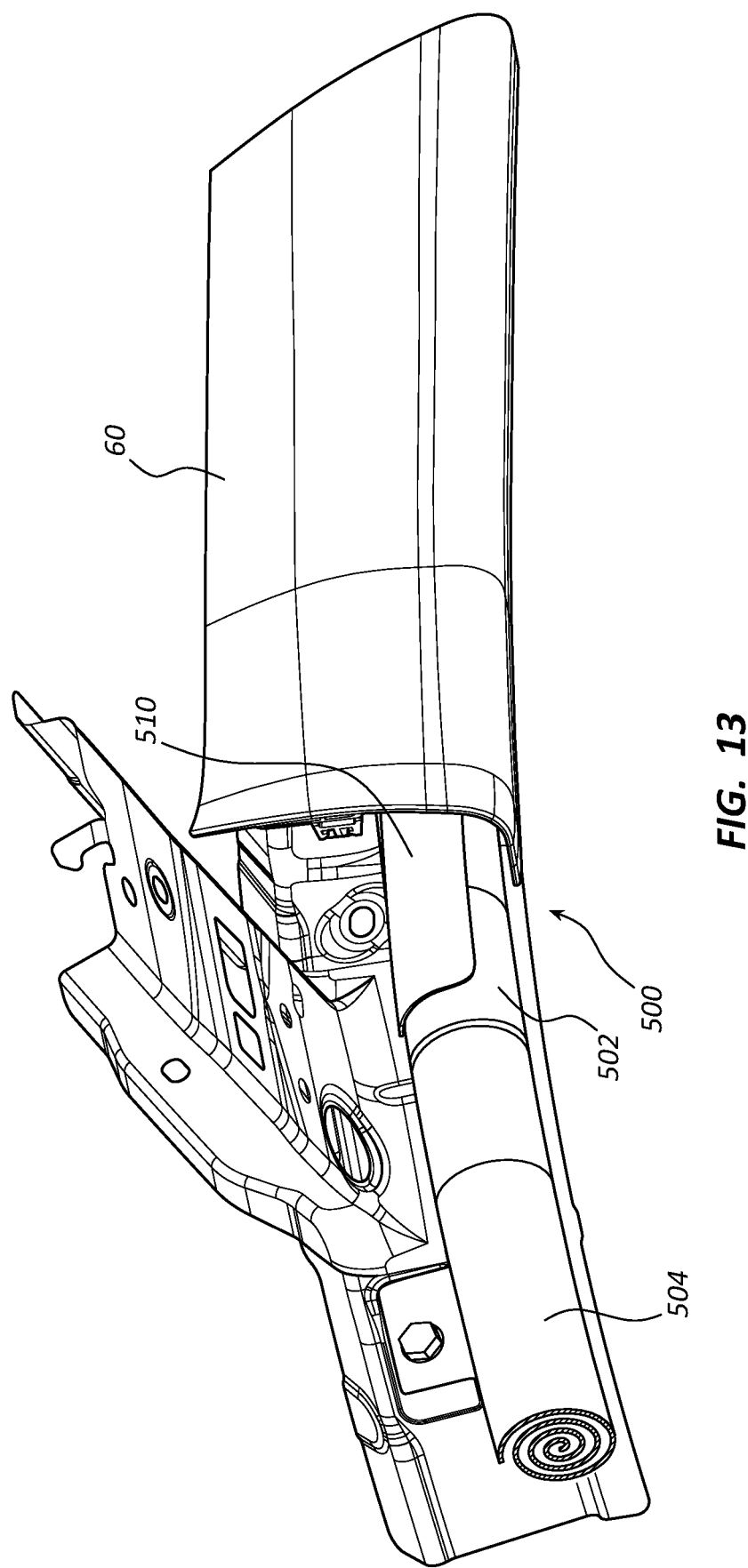
FIG. 13 is a perspective view of the curtain airbag assembly of FIG. 12.
Figure 14:
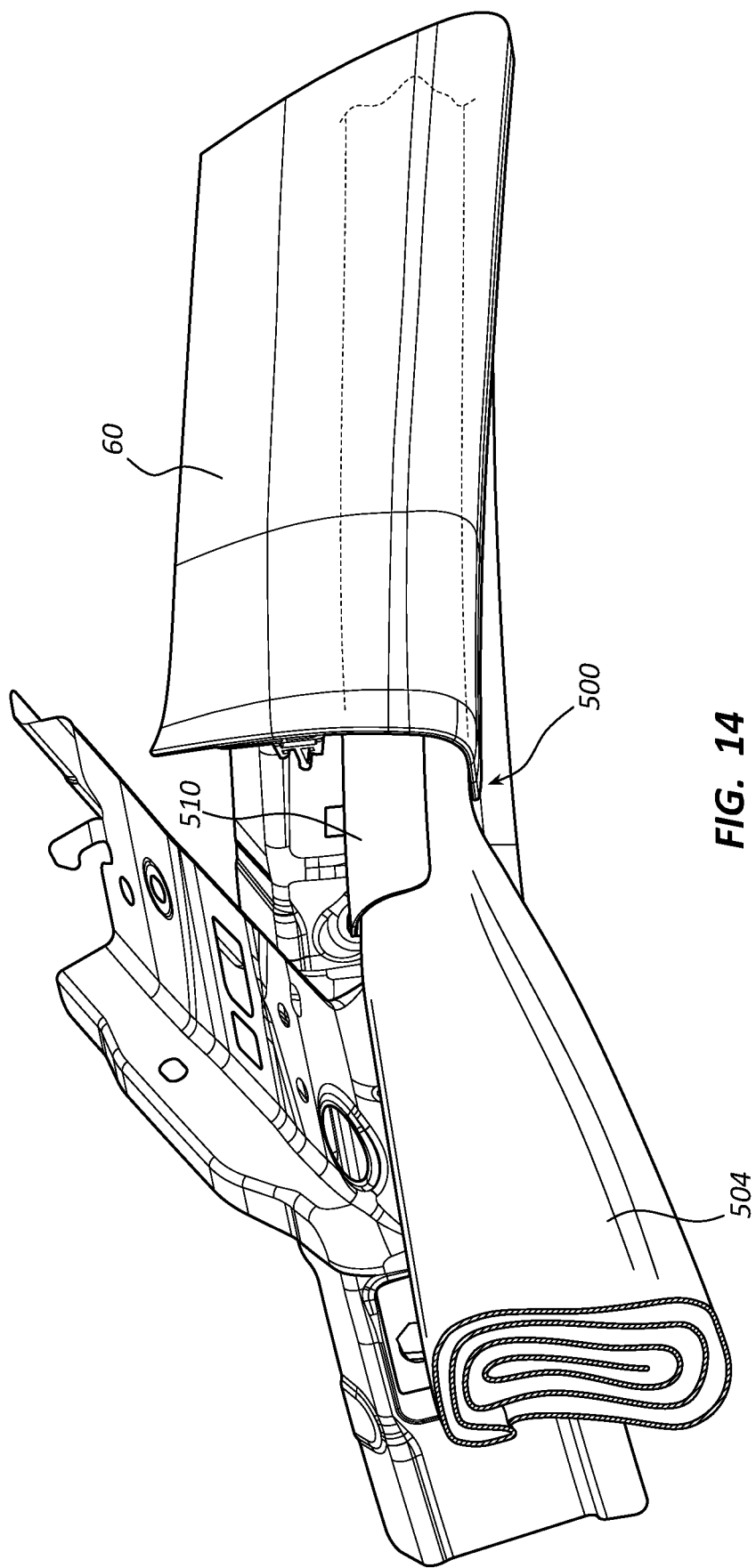
FIG. 14 depicts the embodiment of FIGS. 12 and 13 during deployment.

FIGS. 11A and 11B depict lever member 410 and its associated mounting bracket decoupled from system 400. It can be seen that lever member 410 may otherwise be similar to those in previous figures and may therefore comprise, for example, a semi-circular or otherwise curved inner surface that may be configured to nest on an adjacent cylindrical structure, such as a cylindrical airbag module cover. Although not shown in the figure, additional prongs or other pivoting members may be provided to provide additional leverage and/or facilitate a more secure coupling with an airbag module if desired. In addition, although lever member 410 is shown as being mounted to the vehicle, it is also contemplated that, in other embodiments, lever member 410 may instead be mounted directly to the airbag module, either using a mounting bracket such as mounting bracket 405 or without such a bracket.

FIGS. 12-16 depict another curtain airbag module 500 positioned within a vehicle behind a panel 60 comprising yet another example of an airbag deployment lever member 510. As with previous embodiments, module 500 may comprise a cover 502 and an airbag cushion 504 positioned therein in a cylindrical configuration. As is also the case with the embodiments previously discussed, lever member 510 comprises a main body portion comprising a curved inner surface configured to be seated on cover 502. However, it is contemplated that, in alternative embodiments, including modified versions any of the embodiments discussed above, the lever member may instead be flat or at least have a flat surface, or may comprise any other desired shape to facilitate a secure coupling with an airbag module and/or to provide a pivoting and/or lever action during airbag deployment such that the deployment forces automatically pivot, rotate, or otherwise move to provide an assisting force against an adjacent structure, such as a panel of a vehicle, in order to open the structure and place it a sufficient distance from the airbag cushion so as to avoid impeding the desired deployment characteristics of the cushion.

However, in this example, lever member 510 is physically coupled to panel 60 itself. It is contemplated that lever member 510 may therefore be provided with the vehicle itself, or lever member 510 may be removably coupleable to panel 60 and therefore may be provided with airbag module 500, as would typically be the case with the embodiments previously discussed. This can be best seen in the cross-sectional view of FIG. 15A, which shows a tab 514 extending between the outer surface of the main body portion of lever member 510 and an inner surface of panel 60. Tab 514 may be welded, molded, or otherwise fixedly coupled to panel 60 and lever member 510. Alternatively, tab 514 may be pivotably coupled between panel 60 and lever member 510. For example, in some embodiments, a hinge, joint, socket, or other suitable pivotable coupling member may be used to provide such a pivotable coupling, which may allow lever member 510 to pivot against the panel 60 and, in the case of the depicted embodiment, allow one or both of the opposing prongs 512A and 512B to contact an opposing structure, such as an opposing portion of the vehicle, to provide additional points of contact for applying and distributing the force to pry open panel 60 during deployment.

As seen in several of the accompanying figures, one of the opposing prongs may be longer than the other and/or may have a different shape, if desired. To explain in the context of lever member 510, prong 512B is longer than prong 512A. As best seen in FIG. 15A, this may allow a portion of the distal end of prong 512B to be positioned adjacent to a surface feature of the vehicle, which may allow lever member 510 to rotate about the axis of the lever member 510 during deployment, in some cases in addition to pivoting this axis itself, during deployment, while prong 512B slides against the adjacent surface, which may be a surface near an edge, as shown in the figure. In this manner, lever member 510 may both provide a prying force and rotate away from the deploying airbag cushion to ensure that the lever member does not interfere with the deployment. This rotation and pivotal movement can be seen in, for example, FIG. 16A, in which the airbag cushion 504 itself has been removed but it should be understood that the deploying cushion itself would typically provide the forces used to pivot and/or turn the lever member and assist in opening panel 60 or another adjacent structure, as discussed throughout this disclosure.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A curtain airbag cushion assembly, comprising:
   an inflator;
   a curtain airbag cushion fluidly coupled with the inflator, wherein the curtain airbag cushion is configured to deploy in a deployment direction adjacent to a vehicle door, and wherein the curtain airbag cushion extends along an elongated axis prior to deployment; and
   a lever member coupled with the curtain airbag cushion, wherein the lever member comprises an elongated lever member extending along an elongated axis defined between a first end and a second end opposite the first end, wherein the elongated axis of the lever member is at least substantially parallel with the elongated axis of the curtain airbag cushion prior to deployment, and wherein the lever member is configured to pivot along the elongated axis of the lever member by application of a force at the first end of the lever member prior to the second end of the lever member during deployment of the curtain airbag cushion using forces generated from inflation of the curtain airbag cushion to pry an adjacent portion of a vehicle interior open during deployment.

2. The airbag cushion assembly of claim 1, wherein the curtain airbag cushion is in an at least substantially cylindrical configuration prior to deployment, and wherein the lever member comprises a curved surface configured to allow the lever member to be seated on a curved surface of the at least substantially cylindrical curtain airbag cushion.

3. The airbag cushion assembly of claim 2, wherein the lever member further comprises a prong extending from the second end of the lever member.

4. The airbag cushion assembly of claim 3, wherein the prong extends from the lever member in a direction at least substantially perpendicular to the elongated axis of the lever member so as to define, at least in part, a prong surface opposite from the curved surface.

5. The airbag cushion assembly of claim 4, wherein the prong is configured to serve as a pivot point against at least a portion of a vehicle to pry the adjacent portion of the vehicle interior open during deployment.

6. The airbag cushion assembly of claim 3, wherein the lever member further comprises a second prong extending from the second end of the lever member in a direction opposite from the prong.

7. The airbag cushion assembly of claim 1, wherein the adjacent portion of the vehicle interior comprises a pillar trim.

8. An airbag cushion assembly, comprising:
an elongated airbag cushion extending along an elongated axis and configured to deploy in an uneven manner in a deployment direction at least substantially perpendicular to the elongated axis such that one or more portions of the elongated airbag cushion extend in the deployment direction before one or more other portions of the elongated airbag cushion during inflation; and
an elongated lever member coupled to the elongated airbag cushion, the elongated lever member comprising a first end and a second end opposite the first end defining an elongated axis defined between the first end and the second end, wherein the elongated axis of the elongated lever member is at least substantially parallel with the elongated axis of the elongated airbag cushion prior to deployment, wherein the elongated lever member is positioned and configured to receive a force from the elongated airbag cushion during inflation at the first end before the second end so as to pivot the elongated lever member along the elongated axis of the elongated lever member by application of a force at the first end of the elongated lever member prior to the second end of the elongated lever member and apply a prying force to an adjacent structure during inflation.

9. The airbag cushion assembly of claim 8, wherein the elongated airbag cushion comprises a curtain airbag cushion.

10. The airbag cushion assembly of claim 8, wherein the elongated lever member further comprises a curved surface configured to nestably seat on a curved surface of the elongated airbag cushion prior to deployment.

11. The airbag cushion assembly of claim 8, wherein the elongated lever member further comprises a prong extending from the second end.

12. The airbag cushion assembly of claim 11, wherein the prong extends from the elongated lever member in a direction at least substantially perpendicular to the elongated axis of the elongated lever member extending between the first and second ends.

13. The airbag cushion assembly of claim 12, wherein the elongated lever member further comprises a second prong extending from the second end in a direction opposite from the prong.

14. The airbag cushion assembly of claim 8, further comprising a second elongated lever member coupled to the elongated airbag cushion, wherein the second elongated lever member comprises a first end and a second end opposite the first end, wherein the second elongated lever member is positioned and configured to receive a force from the elongated airbag cushion during inflation at the first end before the second end so as to pivot the second elongated lever member and apply a prying force to a second adjacent structure of a vehicle during inflation.

* * * * *